(12) United States Patent
Furcoiu

(10) Patent No.: US 11,035,513 B2
(45) Date of Patent: Jun. 15, 2021

(54) STENT WITH COILED SPRING

(71) Applicant: Mueller International, LLC, Atlanta, GA (US)

(72) Inventor: Aurelian Ioan Furcoiu, Chattanooga, TN (US)

(73) Assignee: Mueller International , LLC, Atlanta, GA (US)

( * ) Notice: Subject to any disclaimer, the term of this patent is extended or adjusted under 35 U.S.C. 154(b) by 0 days.

(21) Appl. No.: 16/786,193

(22) Filed: Feb. 10, 2020

(65) Prior Publication Data
US 2020/0292119 A1    Sep. 17, 2020

Related U.S. Application Data

(60) Provisional application No. 62/819,106, filed on Mar. 15, 2019.

(51) Int. Cl.
*F16L 55/163*    (2006.01)

(52) U.S. Cl.
CPC .................................. *F16L 55/163* (2013.01)

(58) Field of Classification Search
CPC ..... F16L 55/16; F16L 55/163; F16L 55/1683; F16L 55/44; F16L 55/5517
USPC ......................... 138/98, 97; 405/150.1, 184.1
See application file for complete search history.

(56) References Cited

U.S. PATENT DOCUMENTS

| | | | |
|---|---|---|---|
| 3,895,652 A * | 7/1975 | Zach | B65D 39/12 138/89 |
| 4,589,447 A * | 5/1986 | Kane | E03F 3/06 138/98 |
| 4,647,072 A * | 3/1987 | Westman | B25B 27/02 138/97 |
| 5,119,862 A | 6/1992 | Maimets et al. | |
| 5,351,720 A | 10/1994 | Maimets | |
| 6,712,556 B2 | 3/2004 | Penza | |
| 6,820,653 B1 | 11/2004 | Schempf et al. | |
| 7,025,580 B2 | 4/2006 | Heagy et al. | |
| 8,488,290 B2 | 7/2013 | Kauffman | |
| 8,783,297 B2 | 7/2014 | Hawwa et al. | |
| 10,641,427 B2 | 5/2020 | Braun et al. | |
| 2002/0144822 A1 | 10/2002 | Hackworth et al. | |

(Continued)

FOREIGN PATENT DOCUMENTS

| EP | 0621015 | 10/1994 |
|---|---|---|
| KR | 1020070018627 | 2/2007 |

(Continued)

OTHER PUBLICATIONS

Braun, Clifton; Non-Final Office Action for U.S. Appl. No. 16/112,207, filed Aug. 24, 2018, dated Nov. 5, 2019, 14 pgs.

(Continued)

*Primary Examiner* — Patrick F Brinson
(74) *Attorney, Agent, or Firm* — Taylor English Duma LLP

(57) ABSTRACT

Example aspects of a stent for repairing a pipe and a method for repairing a pipe are disclosed. The stent for repairing a pipe can comprise a coiled extension stent spring comprising a plurality of spring coils and a seal assembled with the coiled extension stent spring and configured to engage an inner surface of a pipe, wherein the stent is configurable in an extended configuration and a contracted configuration, the coiled stent spring biasing the stent to the contracted configuration.

11 Claims, 4 Drawing Sheets

(56) References Cited

U.S. PATENT DOCUMENTS

| | | |
|---|---|---|
| 2003/0017775 A1 | 1/2003 | Sowinski et al. |
| 2004/0236398 A1 | 11/2004 | Burgmeier et al. |
| 2008/0255660 A1 | 10/2008 | Guyenot et al. |
| 2011/0264186 A1 | 10/2011 | Berglung et al. |
| 2012/0273078 A1 | 11/2012 | Hawwa et al. |
| 2013/0018450 A1 | 1/2013 | Hunt |
| 2013/0158646 A1 | 6/2013 | Roeder |
| 2016/0120638 A1 | 5/2016 | Michalak |
| 2016/0143732 A1 | 5/2016 | Glimsdale |
| 2017/0231765 A1 | 8/2017 | Desrosiers et al. |
| 2017/0304092 A1 | 10/2017 | Hong et al. |
| 2019/0093813 A1 | 3/2019 | Badger et al. |
| 2019/0301657 A1 | 10/2019 | Braun et al. |
| 2020/0224811 A1 | 7/2020 | Braun et al. |
| 2020/0263823 A1 | 8/2020 | Furcoiu |
| 2020/0292120 A1 | 9/2020 | Furcoiu |
| 2020/0340610 A1 | 10/2020 | Furcoiu |
| 2021/0041051 A1 | 2/2021 | Furcoiu |
| 2021/0041052 A1 | 2/2021 | Furcoiu |

FOREIGN PATENT DOCUMENTS

| | | |
|---|---|---|
| WO | 2011001189 | 1/2011 |
| WO | 2019194870 | 10/2019 |
| WO | 2020172136 | 8/2020 |
| WO | 2020219294 | 10/2020 |

OTHER PUBLICATIONS

Braun, Clifton; Notice of Allowance for U.S. Appl. No. 16/112,207, filed Aug. 24, 2018, dated Feb. 13, 2020, 13 pgs.

Braun, Clifton; International Search Report for PCT Application No. PCT/US18/63325, filed Nov. 30, 2018, dated Feb. 5, 2019, 8 pgs.

Braun, Clifton; International Preliminary Report on Patentability for PCT Application No. PCT/US18/63325, filed Nov. 30, 2018, dated Oct. 15, 2020, 7 pgs.

Furcoiu, Aurelian Ioan; International Search Report and Written Opinion for PCT Application No. PCT/US20/28038, filed Apr. 14, 2020, dated Jun. 24, 2020, 9 pgs.

Furcoiu, Aurelian Ioan; International Search Report and Written Opinion for PCT Application No. PCT/US20/18593, filed Feb. 18, 2020, dated May 7, 2020, 9 pgs.

Furcoiu, Aurelian Ioan; Requirement for Restriction/Election for U.S. Appl. No. 17/792,984, filed Feb. 18, 2020, dated Apr. 1, 2021, 6 pgs.

Furcoiu, Aurelian Ioan; Non-Final Office Action for U.S. Appl. No. 16/786,246, filed Feb. 10, 2020, dated Mar. 4, 2021, 21 pgs.

Furcoiu, Aurelian Ioan; Requirement for Restriction/Election for U.S. Appl. No. 16/786,246, filed Feb. 10, 2020, dated Feb. 3, 2021, 6 pgs.

* cited by examiner

STENT WITH COILED SPRING

CROSS-REFERENCE TO RELATED APPLICATIONS

The present application claims the benefit of U.S. Provisional Application No. 62/819,106, filed Mar. 15, 2019, which is hereby specifically incorporated by reference herein in its entirety.

TECHNICAL FIELD

This disclosure relates to the field of pipe repair. More specifically, this disclosure relates to a pipe repair stent comprising a coiled spring.

BACKGROUND

Piping systems, including municipal water systems, can develop breaks in pipe walls that can cause leaking. Example of breaks in a pipe wall can include radial cracks, axial cracks, point crack, etc. Repairing a break in a pipe wall often requires the piping system to be shut off, which can be inconvenient for customers and costly for providers. Further, repairs can necessitate grandiose construction, including the digging up of streets, sidewalks, and the like, which can be costly and time-consuming.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is stent for repairing a pipe, the stent comprising a coiled extension stent spring comprising a plurality of spring coils; and a seal assembled with the coiled extension stent spring and configured to engage an inner surface of a pipe, wherein the stent is configurable in an extended configuration and a contracted configuration, the coiled stent spring biasing the stent to the contracted configuration.

Also disclosed is a stent for repairing a pipe comprising a coiled wrapped stent spring comprising a plurality of spring coils; and a seal assembled with the coiled wrapped stent spring and configured to engage an inner surface of the pipe, wherein the stent is configurable in an compressed configuration and an expanded configuration, the coiled wrapped stent spring biasing the stent to the expanded configuration.

A method for repairing a pipe is also disclosed, the method comprising providing a stent, the stent comprising a coiled stent spring and a seal, the stent configurable in a contracted configuration and an extended configuration; orienting the stent in the extended configuration; positioning the stent proximate to a crack in the pipe; moving the stent from the extended configuration to contracted configuration; and engaging the crack with the seal.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1A:
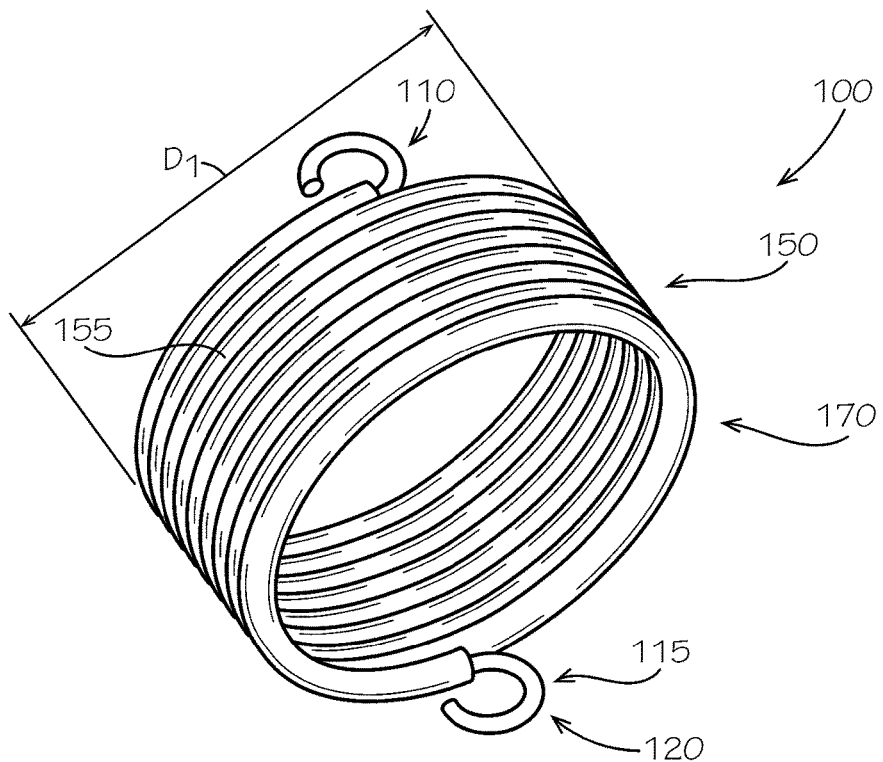
FIG. 1A is a top perspective view of a stent comprising a coiled stent spring and a seal, in accordance with an aspect of the present disclosure, wherein the stent is in a contracted configuration.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a stent for repairing a pipe and associated methods, systems, devices, and various apparatus. Example aspects of the stent can comprise a coiled stent spring and a seal. It would be understood by one of skill in the art that the disclosed stent for repairing a pipe is described in but a few exemplary aspects among many. No particular terminology or description should be considered limiting on the disclosure or the scope of any claims issuing therefrom.

FIG. 1A illustrates a first aspect of a stent 100 according to the present disclosure. As shown, the stent 100 can comprise a stent spring 110 and a seal 150. In one example aspect, the stent spring 110 can be a coiled stent spring 115, and in a particular aspect, as shown, the stent spring 110 can be a coiled extension stent spring 120. The coiled stent spring 115 can define a plurality of spring coils 220 (shown in FIG. 2). In some aspects, the coiled stent spring 115 can comprise a spring steel wire. In other aspects, the coiled stent spring 115 can comprise a musical wire or another suitable spring wire material. In still other aspects, the coiled stent spring 115 can comprise any other material, including, but not limited to, a metal material such as stainless steel, spring steel, aluminum, nitinol, or cobalt chromium, a plastic material such as nylon, POM (polyoxymethylene), or PVC (polyvinyl chloride), or a carbon fiber material. Optionally, the material can be an NSF certified material that can comply with various public health safety standards. For example, in some aspects, the material can be approved as safe for use in drinking-water applications. Moreover, in some aspects, the coiled stent spring 115 can comprise a coating, such as, for example, a rubber or liquid metal coating. The coating can be configured to improve mechanical properties of the coiled stent spring 115. For example, the coating can improve the tensile strength of the coiled stent spring 115 by providing a flexible and/or springy outer layer. In some aspects, the coating can also be corrosion resistant, or a separate coating can be applied for corrosion resistance. For example, a corrosion resistant coating can comprise a zinc-nickel material, phosphate, electrophoretic paint (e-coating), polyester, fusion-bonded epoxy (FBE), or any other suitable corrosion resistant material.

According to example aspects, the seal 150 can define a hollow, elongated tubular sleeve 155 configured to encase each of the spring coils 220 of the coiled stent spring 115 therethrough. Example aspects of the seal 150 can comprise a flexible and compressible material, such as, for example, neoprene. In other aspects, the seal 150 can be formed from another synthetic rubber material such as EPDM rubber, natural rubber, foam, epoxy, silicone, a resin-soaked cloth, or any other suitable flexible material for providing a watertight seal. In the present aspect, the seal 150 can be retained on the coiled stent spring 115 by snugly wrapping around each of or coating the spring coils 220 (shown in FIG. 2) to create tension between the seal 150 and coiled stent spring 115. According to other example aspects, the seal 150 can be retained on the coiled stent spring 115 by stitching, adhesives, ties, clips, or any other suitable fastener known in the art.

Figure 1B:
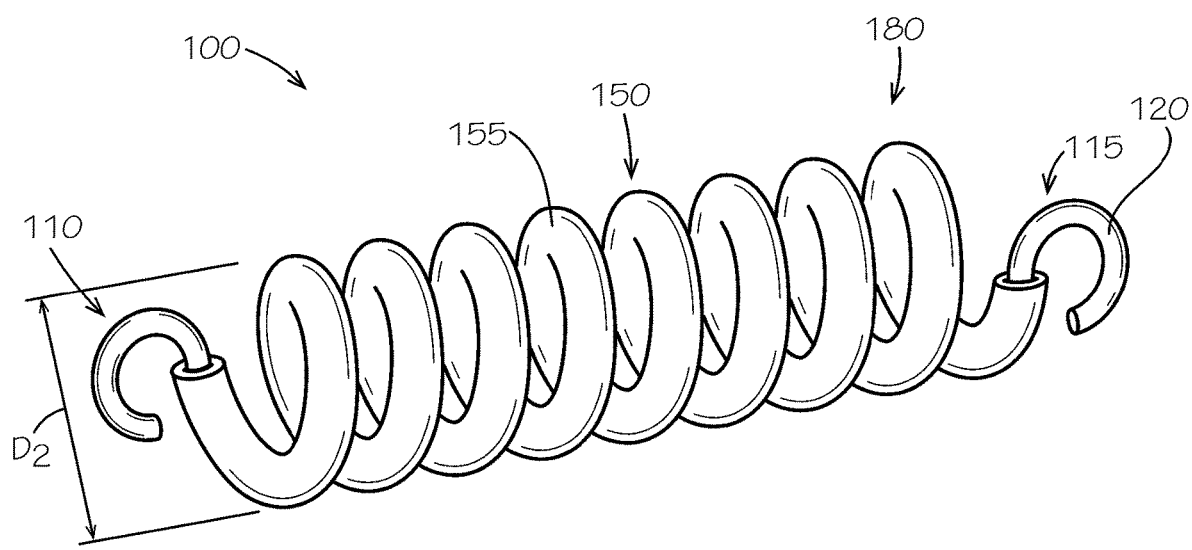
FIG. 1B is a top perspective view of the stent of FIG. 1A in an expanded configuration.

Example aspects of the coiled stent spring 115 can define a spring force and can be extendable and contractible, such that the stent 100 can be oriented in a natural, contracted configuration, as shown in FIG. 1A, and an extended configuration (shown in FIG. 1B). In example aspects, the coiled stent spring 115 can bias the stent 100 to the contracted configuration. According to example aspects, an overall stent diameter of the stent can be increased in the contracted configuration and decreased in the extended configuration. For example, in the contracted configuration, the stent 100 can define a contracted stent diameter $D_1$ that can be greater than an extended stent diameter $D_2$ of the stent in the extended configuration.

FIG. 1B illustrates the stent 100 in the extended configuration. According to example aspects, as shown, the coiled stent spring 115 can be extended in the extended configuration, such that the stent 100 can define the extended stent diameter $D_2$, which can be less than the contracted stent diameter $D_1$ of the stent 100 in the contracted configuration. Furthermore, in the extended configuration, the coiled stent spring 115 can be lengthened to define an extended length of the stent 100 that can be greater than a contracted length of the stent 100 in the contracted configuration (shown in FIG. 1A), as described in further detail below with respect to FIG. 2.

Figure 2:
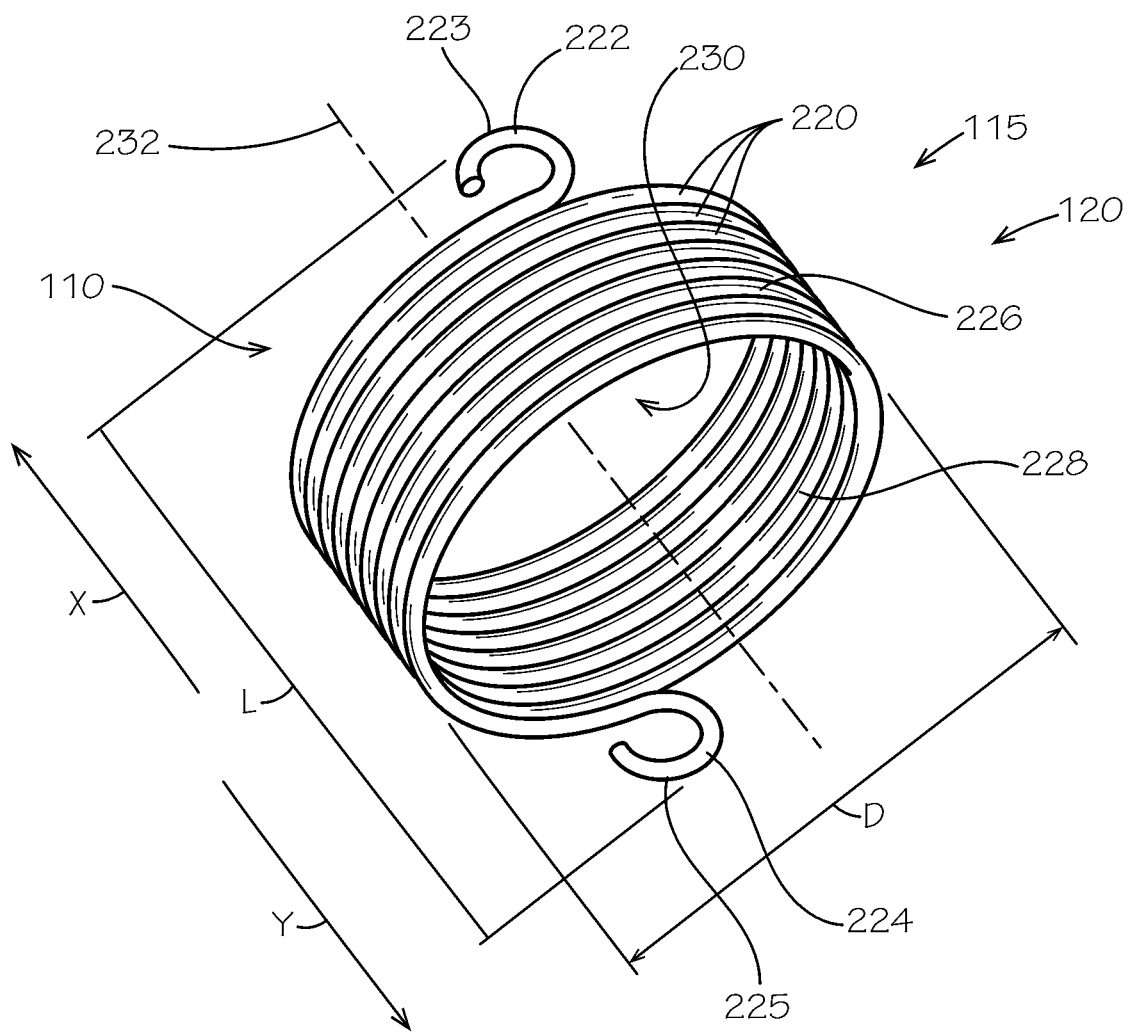
FIG. 2 is a top perspective view of the coiled stent spring of FIG. 1A.

Referring to FIG. 2, as shown, the coiled extension stent spring 120 can define the plurality of the spring coils 220 oriented between opposing ends (e.g. a first end 222 and a second end 224) thereof. In some aspects, a first hook 223 can be defined by the coiled extension stent spring 120 at the first end 222, and a second hook 225 can be defined by the coiled extension stent spring 120 at the second end 224, as shown. In other aspects, the first and second hooks 223,225 can be attached to the coiled extension stent spring 120 by a fastener. In still other aspects, the coiled extension stent spring 120 can define another pulling structure at the first and second ends 222,224 thereof, such as, for example, a first loop and a second loop, respectively. The coiled extension stent spring 120 can further generally define an outer surface 226 and an opposite inner surface 228. The inner surface 228 can define a void 230, as shown, which can extend between the first and second ends 222,224 of the coiled extension stent spring 120, and can allow fluid to pass therethrough. A central axis 232 can extend substantially through a center of the void 130, as shown.

In the extended configuration (shown in FIG. 1B), a pulling force can be applied to the each of the opposing first and second ends 222,224 of the coiled extension stent spring 120, such that a length L of the coiled extension stent spring 120 can be increased and a diameter of the coiled extension stent spring 120 can be reduced. Thus, as described above, the extended stent diameter $D_2$ (shown in FIG. 1B) of the stent 100 (shown in FIG. 1A) in the extended configuration can be less than the contracted stent diameter $D_1$ (shown in FIG. 1A) of the stent 100 in the contracted configuration. For example, the pulling forces can be applied to the first and second hooks 223,225 in opposite directions X,Y, respectively, to overcome the spring force of the coiled extension stent spring 120 and pull the first and second hooks 223,225 away from one another. In the natural, contracted configuration, as illustrated, the pulling force can be reduced or removed, such that the spring force of the coiled extension stent spring 120 can bias the spring coils 220 towards each other in the axial direction, shortening the length L of the coiled extension stent spring 120 and increasing the diameter D of the coiled extension stent spring 120. In other aspects, a pulling force can be applied to only one of the first and second ends 222,224 while the other of the first and second ends 222,224 remains fixed.

Figure 3:
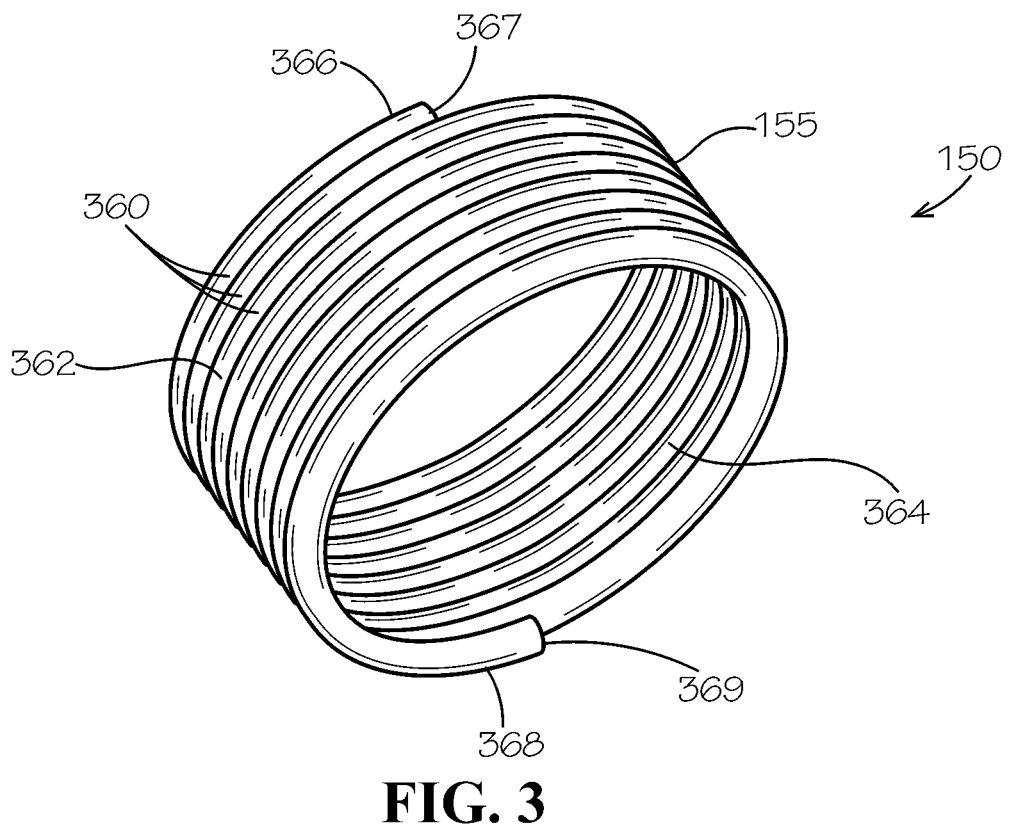
FIG. 3 is a top perspective view of the seal of FIG. 1A.

FIG. 3 illustrates an example aspect of the seal 150. As shown, the seal 150 can define the hollow tubular sleeve 155, which can be oriented in a coiled configuration, such that seal 150 can define a plurality of seal coils 360. The seal coils 360 can correspond to the spring coils 220 (shown in FIG. 2) of the coiled extension stent spring 120 (shown in FIG. 1A). In some aspects, the seal coils 360 can be sealed together to create a watertight barrier between each of the seal coils 360. In other aspects, the seal coils 360 may not be sealed together, and the spring force of the stent spring 110 (shown in FIG. 1A) can bias the seal coils 360 together to create a watertight seal therebetween. As shown, in the coiled configuration, the seal 150 can generally define an outer surface 362 and an inner surface 364. The seal 150 can also define a first seal end 366 and a second seal end 368, which can define a first opening 367 and a second opening 369, respectively. According to example aspects, the first opening 367 and second opening 369 can allow access to an interior of the hollow tubular sleeve 155. The seal 150 can be configured such that each of the spring coils 220 (shown in FIG. 2) can be completely encased in the tubular sleeve 155 when the seal 150 is assembled with the coiled extension stent spring 120 (shown in FIG. 1A), and such that the first and second hooks 223,225 (shown in FIG. 2) can extend out of the first and second openings 367,369, respectively. In one aspect, the seal 150 can be assembled with the coiled stent spring 115 by feeding the coiled stent spring 115 into one of the first and second openings 367,369 and through the interior of the hollow tubular sleeve 155.

In other aspects, the seal 150 can define a shorter, hollow cylindrical structure defining an axis coinciding with the axis 232 (i.e., the seal 150 can be concentric to the axis 232) and configured to wrap around a circumference of the coiled stent spring 115, such that the inner surface 364 of the seal 150 can engage the outer surface 226 of the coiled stent spring 115. In a particular aspect, the seal 150 can cover the entire (or almost the entire) outer surface 226 of the coiled stent spring 115, while in other aspects, the seal 150 can cover only a portion of the outer surface 226 of the coiled stent spring 115. In still other aspects, the seal 150 may not wrap entirely around the circumference of the coiled stent spring 115.

Figure 4:
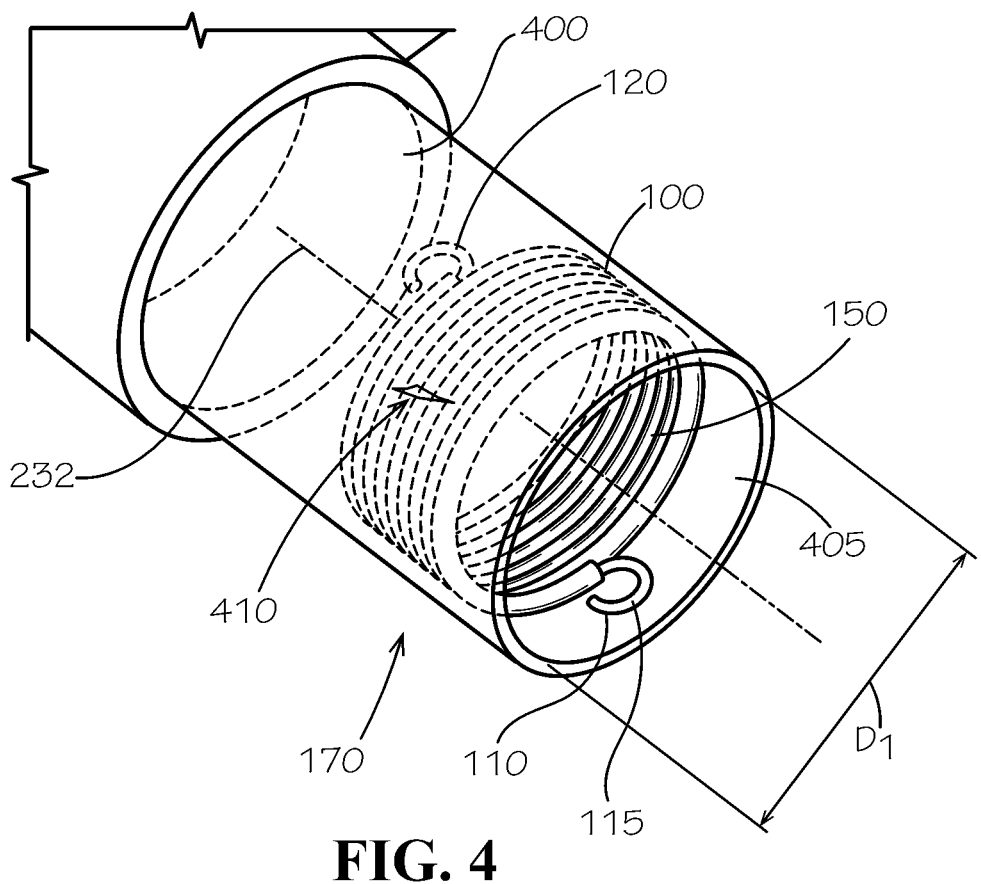
FIG. 4 is a top perspective view of the stent of FIG. 1A engaged with a damaged pipe.

Referring to FIG. 4, according to example aspects, the stent 100 can be expanded within a pipe 400, such that coiled stent spring 115 can press the seal 150 into engagement with an inner wall 405 of the pipe 400 where a crack 410 or other damage is present, in order to create a watertight seal between the stent 100 and the inner wall 405 of the pipe 400 to prevent leaking at the damage site. In the extended configuration, the pulling force(s) can be applied to the stent 100 by a pulling mechanism (not shown). The pulling force(s) can overcome the spring force of the coiled stent spring 115, and the seal 150 and coiled stent spring 115 can be extended along the axial direction to define a smaller spring diameter D (shown in FIG. 2) and a smaller overall stent diameter (i.e., the extended stent diameter $D_2$—shown in FIG. 1A) in the extended configuration. The reduced stent diameter $D_2$ in the extended configuration can allow for easier insertion of the stent 100 into the pipe 400 or a pipeline and easier navigation of the stent 100 through the pipe 400 or pipeline. When the pulling force(s) are removed or reduced to less than the spring force, the coiled stent spring 115 can bias the stent 100 back to the contracted configuration, as shown, wherein the stent defines the contracted stent diameter $D_1$, and the seal 150 can engage the inner wall 405. In other aspects, another other suitable type of force can be applied the stent 100 to bias the stent 100 to the extended configuration.

The coiled stent spring 115 can define is largest diameter D (shown in FIG. 2) in the contracted configuration. In this configuration, the increased diameter D of the coiled stent spring 115 can bias the seal 150 radially outward relative to the central axis 232, such that the seal 150 can move towards and engage the inner wall 405 of the pipe 400. In some aspects, in the contracted configuration, the contracted stent diameter $D_2$ can be slightly greater than a diameter of the inner wall 405 of the pipe 400, such that the stent 100 can apply a force in the radial direction against the inner wall 405 of the pipe 400.

As such, an example aspect of a method for repairing the pipe 400 can comprise applying a force to the coiled stent spring 115 to move the stent 100 from the contracted configuration to the extended configuration, in order to reduce the diameter D (shown in FIG. 2) of the coiled stent spring 115 and the overall stent diameter of the stent 100. The method can further comprise inserting the stent 100 into the pipe 400 and orienting the stent 100 proximate to the crack 140 or other damage in the pipe 400. The method can also comprise removing the force to allow the coiled stent spring 115 to bias the stent 100 back to the contracted configuration, and engaging the inner wall 405 of the pipe at the crack 410 (or other damage) with the seal 150 of the stent 100 to create a watertight seal between the stent 100 and the inner wall 405 of the pipe 400.

Figure 5:
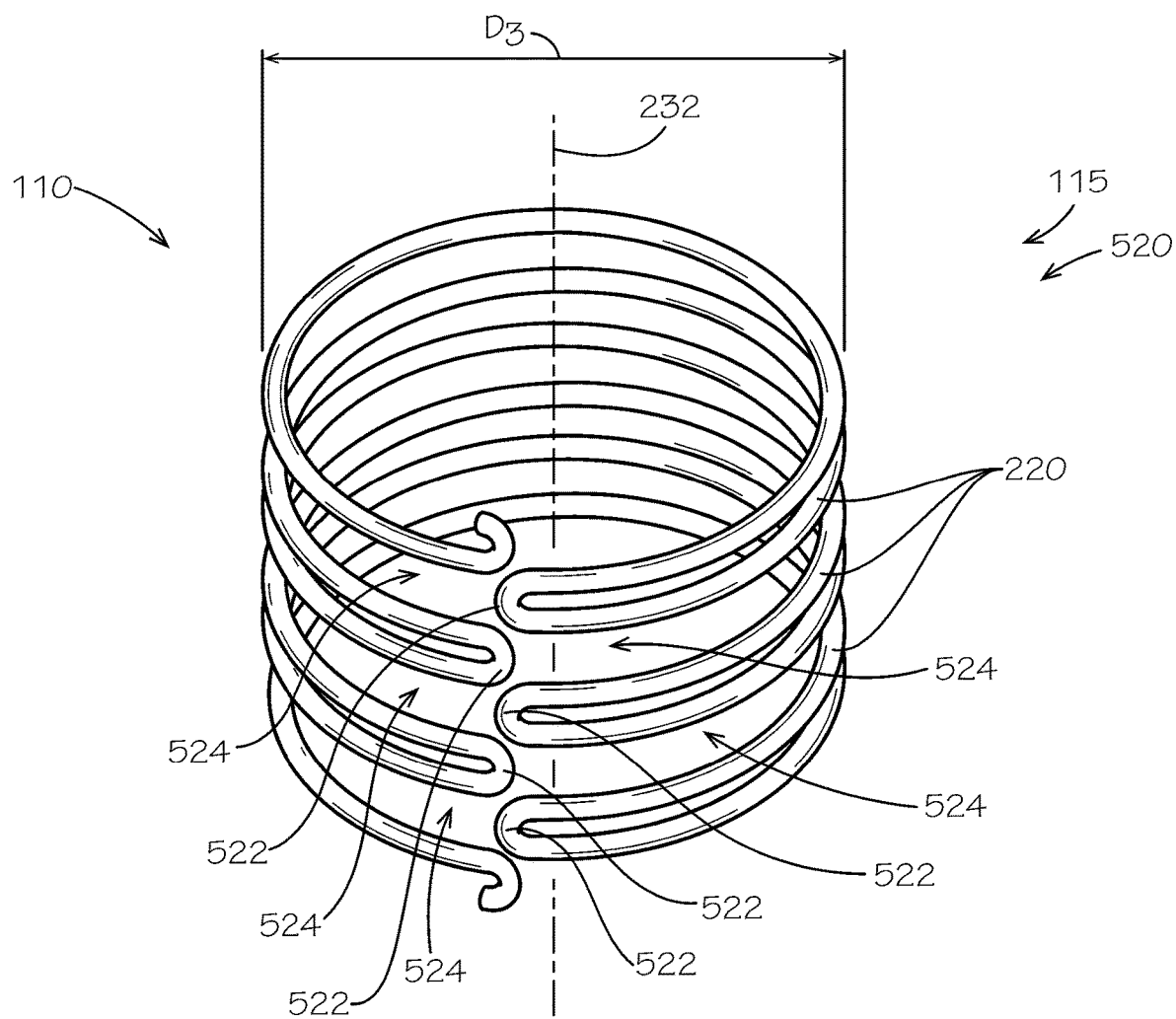
FIG. 5 is a top perspective view of the coiled stent spring according to another aspect of the present disclosure.

FIG. 5 illustrates another aspect of the stent spring 110. The stent spring 110 can again be a coiled stent spring 115. However, in the present aspect, the coiled stent spring 115 can be a coiled wrapped stent spring 520. The stent 100 (shown in FIG. 1A) can comprise the coiled wrapped stent spring 520 and can be configurable in a natural, expanded configuration, as shown, and a compressed configuration. The coiled stent spring 115 can define the plurality of spring coils 220, as illustrated. In the present aspect, the spring coils 220 can define a plurality of closed coil ends 522 and a plurality of open coil channels 524. Each of the closed coil ends 522 can be oriented generally in a facing relationship with a corresponding one of the open coil channels 524, as shown. A compression force, or another suitable force, can be applied in a generally radially inward direction to the coiled stent spring 115 to configure the stent 100 in the compressed configuration. In the compressed configuration, each of the closed coil ends 522 of the spring coils 220 can move in a generally circumferential direction towards, and in some instances can engage, a corresponding one of the open coil channels 524. In the expanded configuration, as shown, the spring force of the coiled stent spring 115 can bias closed coil ends 522 away from the open coil channels 524 to increase a diameter $D_3$ of the coiled wrapped stent spring 520.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A stent for repairing a pipe comprising:
  a coiled extension stent spring comprising a plurality of spring coils; and
  a seal assembled with the coiled extension stent spring and configured to engage an inner surface of a pipe, the seal defining an elongated tubular sleeve encasing each of the plurality of spring coils, wherein the stent is configurable in an extended configuration and a contracted configuration, the coiled extension stent spring biasing the stent to the contracted configuration.

2. The stent for repairing a pipe of claim 1, wherein:
  the coiled extension stent spring defines a first end and an opposing second end;
  the plurality of spring coils extend between the first end and the second end; and
  a pulling structure is oriented at each of the first end and second end.

3. The stent for repairing a pipe of claim 2, wherein the pulling structure at the first end defines a first hook and the pulling structure at the second end defines a second hook.

4. The stent for repairing a pipe of claim 1, wherein:
  the stent defines a contracted stent diameter in the contracted configuration;
  the stent defines an extended stent diameter in the extended configuration; and
  the contracted stent diameter is greater than the extended stent diameter.

5. The stent for repairing a pipe of claim 1, wherein:
  the coiled extension stent spring defines a diameter and a length;
  the diameter of the coiled extension stent spring is greater in the contracted configuration than in the extended configuration; and
  the length of the coiled extension stent spring is lesser in the contracted configuration than in the extended configuration.

6. The stent for repairing a pipe of claim 1, wherein:
  the coiled extension stent spring defines a first end and an opposing second end;
  the coiled extension stent spring further defines an outer surface and an opposite inner surface;
  the inner surface defines a void extending from the first end to the second end; and
  a central axis extends through a center of the void.

7. The stent for repairing a pipe of claim 6, wherein:
  the seal defines a hollow cylindrical structure;
  the hollow cylindrical structure wraps around a circumference of the coiled extension stent spring; and
  an inner surface of the seal engages an outer surface of the coiled extension stent spring.

8. The stent for repairing a pipe of claim 7, wherein the seal is concentric to the central axis.

9. A stent for repairing a pipe comprising:
  a coiled wrapped stent spring comprising a plurality of spring coils, wherein the spring coils define a plurality of closed coil ends and a plurality of open coil channels; and
  a seal assembled with the coiled wrapped stent spring and configured to engage an inner surface of a pipe, wherein the stent is configurable in a compressed configuration and an expanded configuration, the coiled wrapped stent spring biasing the stent to the expanded configuration.

10. The stent for repairing a pipe of claim 9, wherein each of the closed coil ends is oriented in a facing relationship with a corresponding one of the open coil channels.

11. The stent for repairing a pipe of claim 10, wherein:
in the expanded configuration, each of the closed coil ends is biased away from the corresponding one of the open coil channels by a spring force of the coiled wrapped stent spring; and
in the compressed configuration, each of the closed coil ends is moved towards the corresponding one of the open coil channels by a compression force.

\* \* \* \* \*